United States Patent
Miwa et al.

(10) Patent No.: US 10,428,895 B2
(45) Date of Patent: Oct. 1, 2019

(54) VALVE MECHANISM, DAMPING FORCE GENERATING DEVICE, AND SHOCK ABSORBER

(71) Applicant: Showa Corporation, Gyoda-shi (JP)

(72) Inventors: Kazuhiro Miwa, Fukuroi (JP); Yosuke Murakami, Fukuroi (JP)

(73) Assignee: Showa Corporation, Gyoda-shi (JP)

( * ) Notice: Subject to any disclaimer, the term of this patent is extended or adjusted under 35 U.S.C. 154(b) by 114 days.

(21) Appl. No.: 15/259,699

(22) Filed: Sep. 8, 2016

(65) Prior Publication Data

US 2017/0284496 A1   Oct. 5, 2017

(30) Foreign Application Priority Data

Mar. 29, 2016   (JP) .................. 2016-066554

(51) Int. Cl.
| | |
|---|---|
| *F16F 9/34* | (2006.01) |
| *F16F 9/19* | (2006.01) |
| *F16F 9/348* | (2006.01) |
| *F16F 9/46* | (2006.01) |
| *F16F 9/06* | (2006.01) |

(Continued)

(52) U.S. Cl.
CPC ............... *F16F 9/34* (2013.01); *F16F 9/062* (2013.01); *F16F 9/19* (2013.01); *F16F 9/3487* (2013.01); *F16F 9/466* (2013.01); *B62K 25/283* (2013.01); *F16F 9/08* (2013.01); *F16F 9/185* (2013.01); *F16F 13/007* (2013.01); *F16K 27/003* (2013.01); *F16K 31/0655* (2013.01); *F16K 31/0675* (2013.01)

(58) Field of Classification Search
CPC .......... F16F 9/342; F16F 9/348; F16F 9/3482; F16F 9/3485; F16F 9/3487; F16F 9/3488; F16F 9/464; F16F 9/466; F16K 31/0655; F16K 31/0675

See application file for complete search history.

(56) References Cited

U.S. PATENT DOCUMENTS 3,209,780 A * 10/1965 Mercier .................. F16F 9/342
                                                    137/493
4,460,074 A    7/1984 Müller et al.
(Continued)

FOREIGN PATENT DOCUMENTS

| EP | 1508721 A | 2/2005 |
|---|---|---|
| EP | 2270355 A | 1/2011 |

(Continued)

OTHER PUBLICATIONS

Extended European Search Report dated Sep. 14, 2017 for the corresponding European Patent Application No. 16188247.7.

*Primary Examiner* — Bradley T King
(74) *Attorney, Agent, or Firm* — Leason Ellis LLP

(57) ABSTRACT

A valve mechanism includes a housing, a plate-shaped valve body, a valve positioning member, and a drive valve moving mechanism. The valve positioning member causes the valve body to face the valve seat via a predetermined gap with respect to the valve seat. The drive valve moving mechanism causes the gap between an inner circumference of the valve body and the valve seat to be variable by moving the drive valve in a direction of approaching the valve seat and elastically deforming the valve body in a direction that the inner circumference of the valve body approaches the valve seat.

10 Claims, 11 Drawing Sheets

(51) Int. Cl.
  *B62K 25/28*   (2006.01)
  *F16F 9/08*    (2006.01)
  *F16F 9/18*    (2006.01)
  *F16F 13/00*   (2006.01)
  *F16K 27/00*   (2006.01)
  *F16K 31/06*   (2006.01)

(56) References Cited

U.S. PATENT DOCUMENTS

| | | |
|---|---|---|
| 2005/0045438 A1 | 3/2005 | Keller et al. |
| 2006/0054435 A1* | 3/2006 | Yamaguchi ............. F16F 9/065 188/314 |
| 2008/0202329 A1* | 8/2008 | Rolleke ............... F15B 15/1447 92/172 |
| 2011/0073424 A1* | 3/2011 | Murakami ............. F16F 9/465 188/322.13 |
| 2011/0203888 A1 | 8/2011 | Sönseröd |
| 2012/0186924 A1 | 7/2012 | Hovén et al. |
| 2014/0291088 A1* | 10/2014 | Katayama ............. F16F 9/3485 188/313 |
| 2014/0291091 A1 | 10/2014 | Sönseröd |
| 2015/0316118 A1* | 11/2015 | Smeljanskij .......... F16F 9/3485 188/266.1 |
| 2017/0152910 A1* | 6/2017 | Schaffelhofer ........ B60G 13/08 |

FOREIGN PATENT DOCUMENTS

| | | |
|---|---|---|
| EP | 2307760 A | 4/2011 |
| EP | 2492534 A | 8/2012 |
| JP | 2011-525962 A | 9/2011 |
| WO | WO-2009/157841 A | 12/2009 |

\* cited by examiner

VALVE MECHANISM, DAMPING FORCE GENERATING DEVICE, AND SHOCK ABSORBER

CROSS-REFERENCE TO RELATED APPLICATIONS

The present application claims priority under 35 U.S.C. § 119 to Japanese Patent Application No. 2016-066554, filed Mar. 29, 2016. The contents of this application are incorporated herein by reference in their entirety.

BACKGROUND

Field

The present disclosure relates to a valve mechanism, a damping force generating device, and a shock absorber to adjust damping force by controlling fluid flow.

Related Art

A shock absorber to absorb vibration and impact input from a wheel side is arranged, for example, between the wheel and a body of a motorcycle. There has been known a shock absorber including a cylinder in which fluid is encapsulated and connected to one of the wheel and the body, a piston slidably arranged in the cylinder, a piston rod extending outside the cylinder as being connected to the piston and connected to the other of the wheel and the body, and a damping force generating device that generates damping force with fluid flow when the piston slides in the cylinder.

There has been known a so-called electronic control type shock absorber in which damping force to be generated is varied in accordance with drive conditions and the like by controlling fluid flow at the damping force generating portion during driving.

Japanese Patent Application Laid-Open No. 2011-525962 discloses a structure including a valve seat arranged on a channel for fluid and a valve body (valve member) arranged as being capable of advancing to and retreating from the valve seat. Here, fluid flow is controlled by varying a dimension of a channel opening through which fluid flows as being formed at a gap between the valve seat and the valve body. In this structure, the valve body is supported by a plate spring arranged in a housing. The plate spring is elastically deformed in accordance with magnitude of fluid pressure pushing the valve body and the dimension of the channel opening is varied, so that damping force to be generated is varied.

Further, the valve body is arranged at a distal end of a solenoid movable body and the valve body is driven in a direction of being contacted to and apart from the valve seat with electromagnetic force to be generated between a solenoid stator and the solenoid movable body. Owing to that the valve body is displaced against the valve seat by controlling a value of current to be applied to the solenoid stator, the dimension of the channel opening can be varied.

SUMMARY

Accuracy of a dimension of a channel opening especially at a region where a piston operates at slow speed is important for a shock absorber.

In the structure of Patent Document 1, accuracy of the opening between the valve seat and the valve body arranged at the distal end of the solenoid movable body depends on mechanical processing accuracy such as positional accuracy of assembling of the solenoid stator to the housing and opening accuracy of the valve seat in the housing.

An object of the present disclosure is to provide a valve mechanism, a damping force generating device, and a shock absorber capable of adjusting damping force to be generated at higher accuracy.

To solve the abovementioned problem, the present disclosure provides a valve mechanism including a housing including a valve seat that is formed at the outer side, in the radial direction, of an opening at one end of a fluid channel, a drive valve arranged to be movable in a direction of being contacted to and apart from the valve seat, a plate-shaped valve body made of an elastic material having an opening through which fluid passes as being arranged between the valve seat and the drive valve, a valve positioning member that causes the valve body to face the valve seat via a predetermined gap with respect to the valve seat, and a drive valve moving mechanism that causes the gap between an inner circumference of the valve body and the valve seat to be variable by moving the drive valve in a direction of approaching the valve seat and elastically deforming the valve body in a direction that the inner circumference of the valve body approaches the valve seat.

According to the above structure, damping force is generated when fluid flows through a gap between the valve body and the valve seat. In a state that the plate-shaped valve body is not elastically deformed by the drive valve, positioning of the valve body against the valve seat is performed at high accuracy by the valve positioning member. Owing to that the drive valve is moved by a drive valve moving mechanism and the valve body is elastically deformed, the gap between the valve body and valve seat can be adjusted and damping force generated at the gap can be adjusted at high accuracy.

According to a valve mechanism, a damping force generating device, and a shock absorber of the present disclosure, damping force to be generated can be adjusted with a higher degree of accuracy.

DESCRIPTION OF THE EMBODIMENTS

In the following, description will be provided with reference to the attached drawings for actualizing a valve mechanism, a damping force generating device, and a shock absorber of the present disclosure. However, the present disclosure should not be limited to those embodiments.

Figure 1:
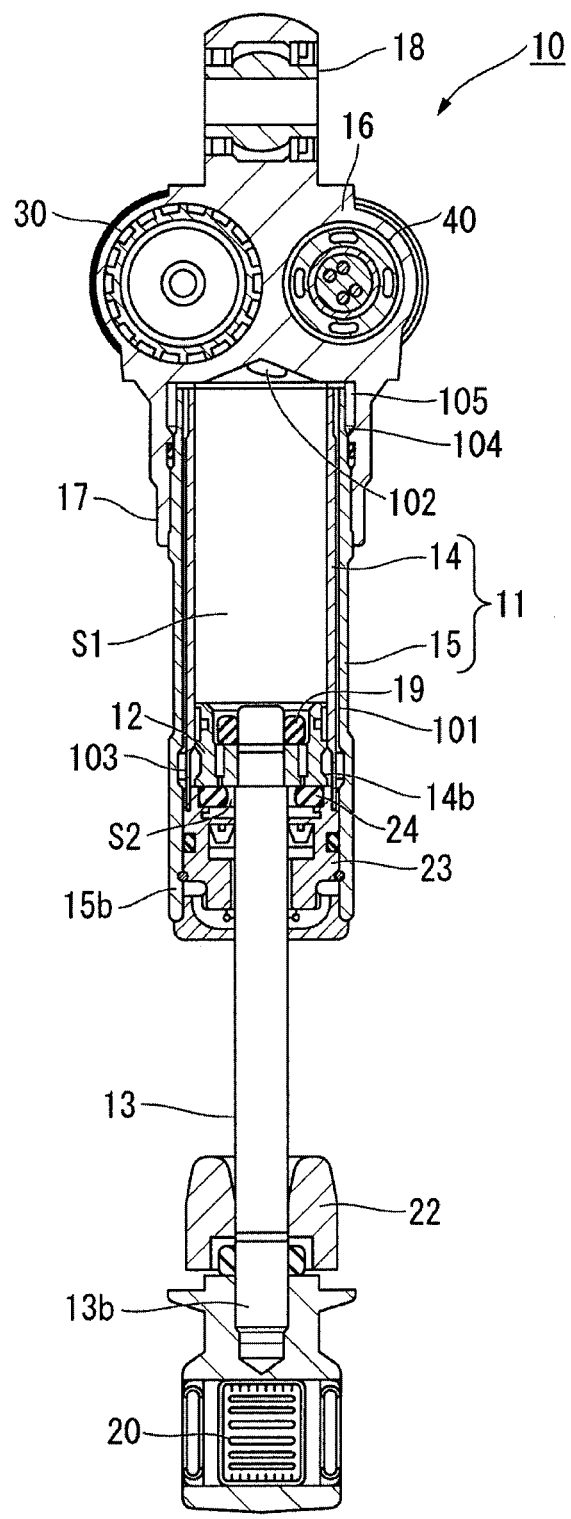
FIG. 1 is a sectional view illustrating an entire structure of a shock absorber of an embodiment of the present disclosure.

FIG. 1 is a sectional view illustrating an entire structure of a shock absorber of an embodiment of the present disclosure.

As illustrated in FIG. 1, a shock absorber 10 is arranged, for example, between a body of a motorcycle and a rear wheel supporting portion that supports a rear wheel and absorbs impact and vibration input from the rear wheel. In the following description, the shock absorber 10 extends in the vertical direction with a body-side attaching portion 18 that is arranged at an upper end thereof connected to a body side and an axle-side attaching portion 20 that is arranged at a lower end thereof connected to a rear wheel side. Here, the present disclosure is not intended to exclude a case that the shock absorber 10 extends, for example, in a lateral direction (approximately in the horizontal direction).

The shock absorber 10 includes a cylinder 11, a piston 12, a piston rod 13, a reservoir 30, a damping force generating device 40, and an unillustrated spring.

The cylinder 11 is structured with an inner cylinder 14 and an outer cylinder 15 that form a concentric double tube. A damper case 16 to which the body-side attaching portion 18 is arranged is arranged at the upper end side of the shock absorber 10. A cylinder-shaped cylinder holding portion 17 extending toward the cylinder 11 is arranged at the damper case 16. The outer cylinder 15 and the inner cylinder 14 are held with the upper end thereof inserted to the cylinder holding portion 17.

The inner diameter of the outer cylinder 15 of the cylinder 11 is set larger than the outer diameter of the inner cylinder 14 by a specific dimension. Accordingly, a cylinder-shaped channel 101 is formed between the outer cylinder 15 and the inner cylinder 14.

The outer cylinder 5 is formed to be protruded to the lower side further than a lower end 14b of the inner cylinder 14 by a specific dimension. A ring-shaped rod guide 23 that supports the piston rod 13 in a slidable manner in the center axis direction is arranged at the inside of a lower end 15b of the outer cylinder 15. The lower end 14b of the inner cylinder 14 is abutted to an upper face of the rod guide 23, and thereby, a lower end of the channel 101 is closed.

A rebound rubber 24 that absorbs impact caused when the piston 12 collides therewith is arranged at the upper side of the rod guide 23.

The piston 12 is arranged at the inside of the inner cylinder 14 of the cylinder 11 in a slidable manner along the center axis direction of the inner cylinder 14. An inner space of the inner cylinder 14 of the cylinder 11 is separated into a piston-side oil chamber S1 formed at the damper case 16 side and a rod-side oil chamber S2 formed at the piston-rod 13 side.

An oil hole 102 opened to the piston-side oil chamber S1 is formed at the damper case 16 at a position opposed to an upper end opening of the inner cylinder 14. The oil hole 102 is communicated with a first oil chamber S11 (see FIG. 3) of the damping force generating device 40.

A plurality of oil holes 103 are formed at the lower end 14b of the inner cylinder 14. The rod-side oil chamber S2 and the channel 101 are communicated through the oil holes 13.

Further, at the upper end of the channel 101, a plurality of oil holes 104 are formed at the outer cylinder 15 at positions facing the cylinder holding portion 17. The piston-side oil chamber S1 and the channel 101 are communicated through the oil holes 104.

A channel 105 that communicates with a third oil chamber S13 (see FIG. 3) of the damping force generating device 40 is formed at the damper case 16 at a position opposed to the oil holes 104.

The piston rod 13 is fixed to the piston 12 with a nut 19. The piston rod 13 extends along the center axis direction of the inner cylinder 14 and is protruded outside the cylinder 11 as penetrating through the rod guide 23. The axle-side attaching portion 20 is arranged at a lower end 13b of the piston rod 13. A bump rubber 22 for preventing bottom striking of the shock absorber 10 is arranged at the axle-side attaching portion 20 on the side of the cylinder 11 as being penetrated by the piston rod 13.

[Reservoir]

Figure 2:
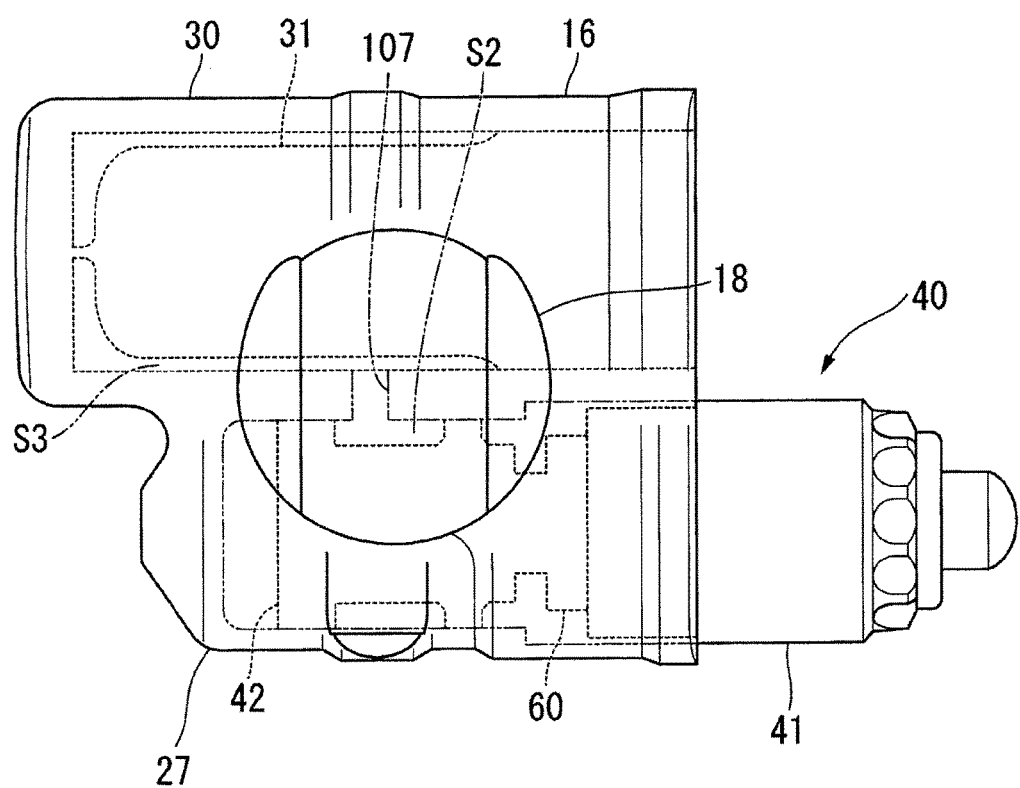
FIG. 2 is a plane view illustrating a damper case arranged in the shock absorber.

FIG. 2 is a plane view illustrating the damper case arranged in the shock absorber.

As illustrated in FIG. 2, the reservoir 30 is formed in the damper case 16, for example, is cylinder-shaped, and accommodates a bag-shaped bladder 31. The bladder 31 is formed of an elastic body such as rubber into a bag shape to be capable of being expanded and contracted. Gas such as air is filled into the bladder 31. In the reservoir 30, a space outside the bladder 31 is an oil reserving chamber S3 that communicates with a second oil chamber S12 (see FIG. 3) of the damping force generating device 40 via the communication path 107.

Oil being fluid is filled into the piston-side oil chamber S1, the rod-side oil chamber S2, the channel 101 between the inner cylinder 14 and the outer cylinder 15 in the cylinder 11, the oil reserving chamber S3 in the reservoir 30, and the damping force generating device 40.

[Damping Force Generating Device]

Figure 3:
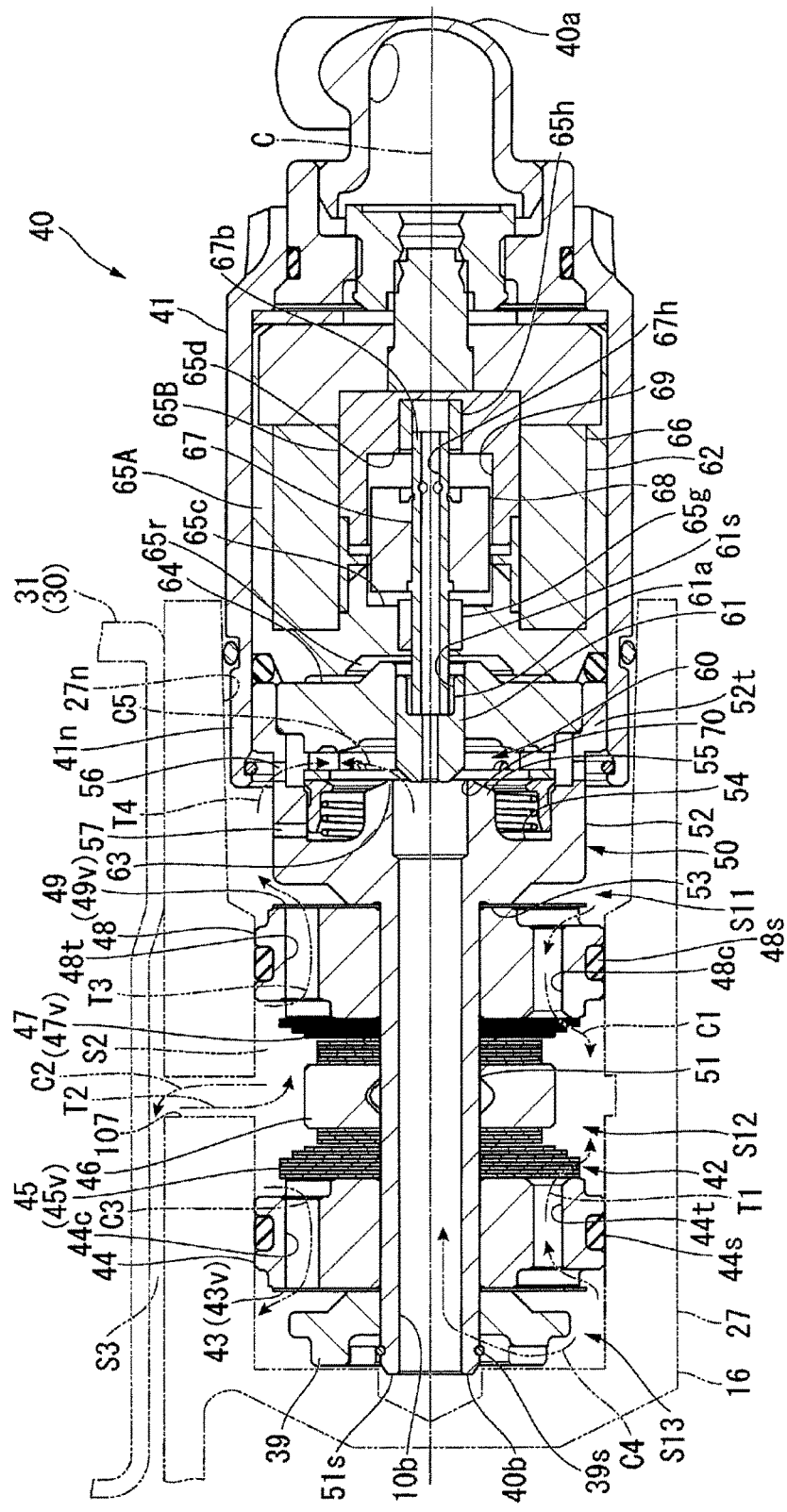
FIG. 3 is a sectional view illustrating a damping force generating device arranged at the damper case.

FIG. 3 is a sectional view illustrating the damping force generating device arranged at the damper case.

The damping force generating device 40 is arranged at a bottomed cylinder-shaped damper holding portion 27 formed at the damper case 16. The damping force generating device 40 being columnar as a whole mainly includes a cartridge case 41, a main damper 42, a valve seat member (housing) 50, and a control valve section 60.

The cartridge case 41 being cylindrical is arranged at one end 40a side of the damping force generating device 40. A male thread 41n is formed at an outer circumferential face of the cartridge case 41. Owing to that the male thread 41n of the cartridge case 41 is screwed to a female thread 27n formed at an inner circumferential face of the damper holding portion 27, the damping force generating device 40 is held by the damper holding portion 27 in a detachably attachable manner.

In the following description, regarding the damping force generating device 40, the one end 40a represents a side on which the cartridge case 41 is arranged and a second end 40b represents a side opposite thereto. Further, a direction connecting the first end 40a and the second end 40b is represented by a center axis C direction.

The main damper 42 is arranged as being exposed from the cartridge case 41 to the second end 40b side of the damping force generating device 40. The main damper 42 includes a valve stopper 39, a compression-side outlet check valve 43, an extension-side valve seat member 44, an extension-side damping valve 45, an intermediate member 46, a compression-side damping valve 47, a compression-side valve seat member 48, and an extension-side outlet check valve 49 in the order thereof from the second end 40b side toward the first end 40a side of the damping force generating device 40. The valve stopper 39, the compression-side outlet check valve 43, the extension-side valve seat member 44, the extension-side damping valve 45, the intermediate member 46, the compression-side damping valve 47, the compression-side valve seat member 48, and the extension-side outlet check valve 49 are ring-shaped, respectively.

Extension-side inlet oil paths 44t and compression-side outlet oil paths 44c are formed at the extension-side valve seat member 44 alternately along the circumferential direction. The extension-side inlet oil paths 44t and the compression-side outlet oil paths 44c are formed as penetrating through the extension-side valve seat member 44 in the center axis C direction, respectively.

The extension-side inlet oil paths 44t are opened to the second end 40b side of the extension-side valve seat member 44. The extension-side damping valve 45 is arranged to close outlets of the extension-side inlet oil paths 44t on the first end 40a side. The extension-side damping valve 45 is formed by layering a plurality of disc valves 45v.

The compression-side outlet paths 44c are opened to the first end 40a side of the extension-side valve seat member 44. The compression-side outlet check valve 43 structured with a disc valve 43v is arranged to close outlets of the compression-side outlet oil paths 44c on the second end 40b side.

Compression-side inlet oil paths 48c and extension-side outlet oil paths 48t are formed at the compression-side valve seat member 48 alternately along the circumferential direction. The compression-side inlet oil paths 48c and the extension-side outlet oil paths 48t are formed as penetrating through the compression-side valve seat member 48 in the center axis C direction, respectively.

The compression-side inlet oil paths 48c are opened to the first end 40a side of the compression-side valve seat member 48. The compression-side damping valve 47 is arranged to close outlets of the compression-side inlet oil paths 48c on the second end 40b side. The compression-side damping valve 47 is formed by layering a plurality of disc valves 47v.

The extension-side outlet paths 48t are opened to the second end 40b side of the compression-side valve seat member 48. The extension-side check valve 49 structured with a disc valve 49v is arranged to close outlets of the extension-side outlet oil paths 48t on the first end 40a side.

The extension-side damping valve 45 and the compression-side damping valve 47 block oil flow normally by closing the compression-side inlet oil paths 48c and the extension-side inlet oil paths 44t and is deformed as being bent in accordance with pressure of oil passing through the compression-side inlet oil paths 48c and the extension-side inlet oil paths 44t, so that damping force is generated when oil passes through a gap against the compression-side inlet oil paths 48s and the extension-side inlet oil paths 44t. The damping force to be generated can be adjusted by adjusting the number of disc valves 45v, 47v of the extension-side damping valve 45 and the compression-side damping valve 47.

The compression-side outlet check valve 43 and the extension-side outlet check valve 49 block oil flow normally by closing the compression-side outlet oil paths 44c and the extension-side outlet oil paths 48t and is deformed as being bent in accordance with pressure of oil passing through the compression-side outlet paths 44c and the extension-side outlet oil paths 48t to circulate oil.

The valve seat member 50 includes a small-diameter portion 51 and a large-diameter portion 52.

The small-diameter portion 51 is formed at the second end 40b side of the valve seat member 50. The small-diameter portion 51 extends along the center axis C direction of the damping force generating device 40 as being inserted through openings formed at centers of the valve stopper 39, the compression-side outlet check valve 43, the extension-side valve seat member 44, the extension-side damping valve 45, the intermediate member 46, the compression-side damping valve 47, the compression-side valve seat member 48, and the extension-side outlet check valve 49 that are ring-shaped. The outer diameter of the small-diameter portion 51 is substantially the same as the diameter of the openings. The valve stopper 39 located on a side being closest to the second end 40b is restricted from being moved in a direction of being removed from the small-diameter portion 51 toward the second end 40b side by a stopper ring 39s arranged on an outer circumferential face of the small-diameter portion 51.

The large-diameter portion 52 having a larger diameter than the small-diameter portion 51 is formed continuously from the first end 40a side of the small-diameter portion 51. An orthogonal plane 53 being orthogonal to the center axis C direction is formed between the large-diameter portion 52 and the small-diameter portion 51. The extension-side outlet check valve 49 is abutted to the orthogonal face 53 and restricted from being moved toward the large-diameter portion 52 side.

Figure 4:
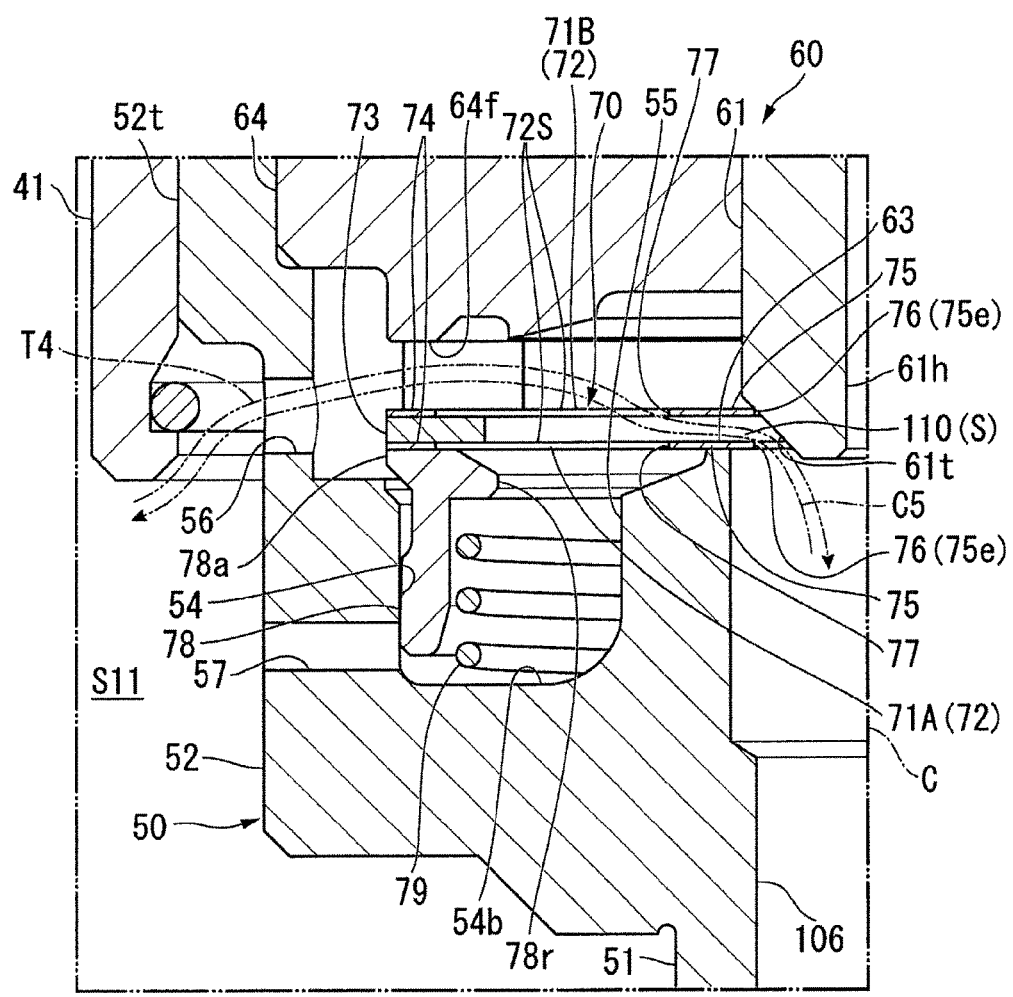
FIG. 4 is an enlarged sectional view illustrating a structure of a control valve section of the damping force generating device.

FIG. 4 is an enlarged sectional view illustrating a structure of the control valve section of the damping force generating device.

As illustrated in FIG. 4, a concave portion 54 concaved toward the small-diameter portion 51 side is formed at the large-diameter portion 52. A boss portion 55 protruded from a bottom face 54b of the concave portion 54 is formed at the center of the concave portion 54 of the large-diameter portion 52.

The large-diameter portion 52 includes a cylinder-shaped portion 52t, on the first end 40a side thereof, extending toward the first end 40a side (upward in FIG. 4) with the diameter thereof enlarged.

The large-diameter portion 52 is provided with channel holes 56, 57 penetrating between the outside and inside thereof. The channel hole 56 is formed at the outer side than the outer circumferences of a first valve 71A and a second valve 71B of the control valve section 60. The channel hole 57 is formed at a position being closer to the bottom face 54b of the concave portion 54 than the channel hole 57.

As illustrated in FIG. 4, a center channel 106 providing communication between a distal end 51s of the small-diameter portion 51 on the second end 40b side and the boss portion 55 of the large-diameter portion 52 is formed at the valve seat member 50.

Regarding the valve seat member 50, the cylinder-shaped portion 52t and a part of the large-diameter portion 52 on the first end 40a side are inserted to the cartridge case 41 while the remaining part of the large-diameter portion 52 on the second end 40b side and the main damper 42 held by the small-diameter portion 51 are exposed to the outside of the cartridge case 41.

The main damper 42 and the large-diameter portion 52 of the valve seat member 50 thus protruded from the cartridge case 41 toward the second end 40b are inserted to the bottomed cylinder-shaped damper holding portion 27.

Returning to FIG. 3, ring-shaped seal rings 44s, 48s are arranged on outer circumferential faces of the extension-side valve seat member 44 and the compression-side valve seat member 48 of the main damper 42, respectively. Owing to that the respective seal rings 44s, 48s are abutted to an inner circumferential face of the damper holding portion 27 in a state that the main damper 42 is accommodated in the damper holding portion 27, the first oil chamber S11, the second oil chamber S12, and the third oil chamber S13 are formed between the damper holding portion 27 and the main damper 42.

The first oil chamber S11 is formed closer to the first end 40a side than the seal ring 48s of the compression-side valve seat member 48. The second oil chamber S12 is formed between the seal ring 44s of the extension-side valve seat member 44 and the seal ring 48s of the compression-side valve seat member 48. The third oil chamber S13 is formed between a bottom portion of the damper case 16 on the second end 40b side and the seal ring 44s of the extension-side valve seat member 44.

The distal end 51s of the small-diameter portion 51 of the valve seat member 50 is arranged in the third oil chamber S13 of the damper case 16. The third chamber S13 is communicated with the center channel 106 formed in the small-diameter portion 51.

A communication path 107 communicating with the oil reserving chamber S3 in the reservoir 30 is formed at the damper case 16 at a position facing the second oil chamber S12 between the compression-side valve seat member 48 and the extension-side valve seat member 44.

The control valve section 60 includes a drive valve 61, a solenoid actuator 62 that drives the drive valve 61, a valve seat 63, and an adjusting valve portion 70 that adjusts the channel opening between the drive valve 61 and the valve seat 63.

The drive valve 61 is arranged in a ring-shaped valve body holder 64 that is fitted into the cylinder-shaped portion 52t of the valve seat member 50 slidably along the center axis C direction of the damping force generating device 40. As illustrated in FIG. 4, a taper portion 61t having an outer diameter gradually deceased toward the valve seat member 50 is formed at a distal end of the drive valve 61 facing to the valve seat member 50. A through-hole 61h providing communication in the center axis C direction is formed at the drive valve 61. Further, a rod accommodating portion 61s is formed at the drive valve 61 at a rear end on the first end 40a side as being concaved toward the distal end thereof (see FIG. 3).

As illustrated in FIG. 3, the solenoid actuator 62 is arranged in the cartridge case 41. The solenoid actuator 62 includes two cores 65A, 65B, a coil 66, a rod 67, and a plunger 68.

The two cores 65A, 65B are formed into bottomed cylinder shapes having concave portions 65c, 65d, respectively. Owing to that the two cores 65A, 65B are arranged with the concave portions 65c, 65d faced to each other, a plunger chamber 69 is formed as continuing in the center axis C direction.

The coil 66 is cylinder-shaped and arranged at the outer circumference side of the plunger chamber 69.

The rod 67 extending in the center axis C direction is held slidably along the center axis C direction by a guide bush 65g arranged in the one core 65A and a guide bush 65h arranged in a concave portion of the other core 65B.

A through-hole 67h penetrating through the center axis C direction is formed at the rod 67.

A distal end of the rod 67 on the second end 40b side is inserted to the rod accommodating portion 61s arranged at the drive valve 61. An outer diameter of the rod 67 is smaller than an inner diameter of the rod accommodating portion 61a. Accordingly, a cylinder-shaped gap 61a is formed between the rod accommodating portion 61s and the rod 67. A communication hole (not illustrated) providing communication between the through-hole 67h and the gap 61a is formed at the distal end of the rod 67.

A back pressure chamber 65r extending to the outer circumference side of the rod 67 is formed between the core 65A and the valve body holder 64. The back pressure chamber 65r communicates with the gap 61a and further communicates with the through-hole 67h of the rod 67 through a communication hole (not illustrated).

Owing to that electromagnetic force to be generated by the coil 66 is adjusted by controlling a current to be applied to the coil 66, the rod 67 of the solenoid actuator 62 advances and retreats in the center axis C direction. According to the advance and retreat of the rod 67, the position of the drive valve 61 can be adjusted in the center axis C direction.

As illustrated in FIG. 4, the valve seat 63 is formed at the outer circumference of an opening of the center channel 106 opened at the boss portion 55 of the valve seat member 50 as being orthogonal to the center axis C.

The adjusting valve portion 70 includes the first valve (valve positioning member) 71A, the second valve (valve positioning member) 71B, and a spacer 73.

Each of the first valve 71A and the second valve 71B is structured with a metal-made plate-shaped valve body 72 made of an elastic material capable of being elastically deformed in the thickness direction thereof.

Figure 5:
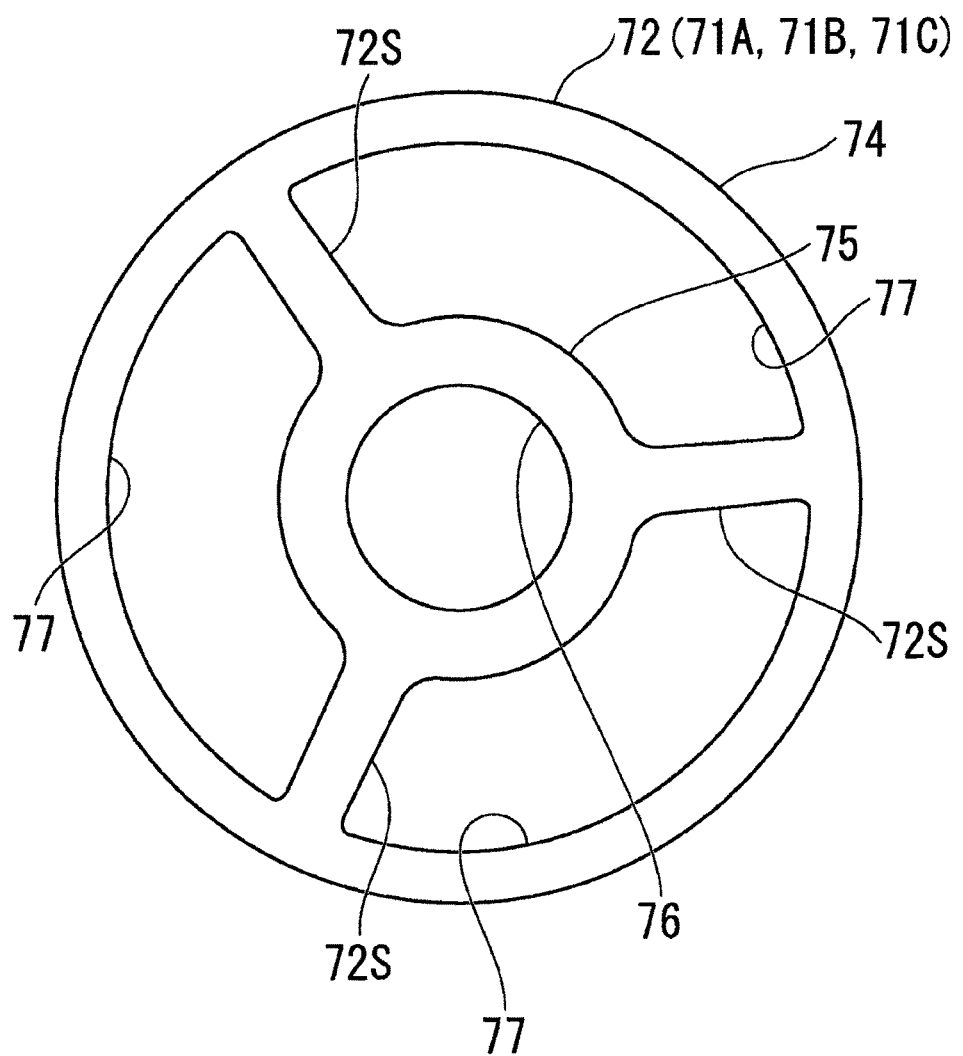
FIG. 5 is a plane view of a valve body that forms each of a first valve and a second valve.

FIG. 5 is a plane view of the valve body that forms each of the first valve and the second valve.

As illustrated in FIG. 5, each valve body 72 includes a ring-shaped outer frame 74, a ring-shaped inner frame 75 concentrically formed inside the outer frame 74, and a center hole 76 formed inside the inner frame 75. Further, a plurality of openings 77 mutually distanced in the circumferential direction are formed between the outer frame 74 and the inner frame 75. Spokes 72S connecting the outer frame 74 and the inner frame 75 are formed at both sides in the circumferential direction of each opening 77.

Returning to FIG. 4, the first valve 71A is arranged on the valve seat 63 side as being capable of being contacted to and apart from the valve seat 63. The second valve 71B is arranged on the drive valve 61 side being opposite to the valve seat 63 via the first valve 71A.

The spacer 73 having a predetermined thickness in the center axis C direction is sandwiched by the outer frame 74 of the first valve 71A and the outer frame 74 of the second valve 71B. The spacer 73 is ring-shaped and has the same outer diameter as that of the first valve 71A and the second valve 71B. According to the spacer 73, a gap channel 110 having the same opening dimension as the thickness of the spacer 73 is formed in the center axis C direction. Here, it is preferable that the thickness of the spacer 73 in the center axis C direction is set to a dimension so as to have a damping function as an orifice S as described later when oil flows through the gap channel 110.

When a current is applied to the coil 66 of the solenoid actuator 62, the taper portion 61*t* of the drive valve 61 is inserted into the center hole 76 of the second valve 71B and abutted to an inner circumferential edge of the inner frame 75 of the second valve 71B. Accordingly, the first valve 71A, the spacer 73, and the second valve 71B are urged toward the valve seat 63 and the first valve 71A is abutted to the valve seat 63. In this state, the inner circumferential edges 75*e* of the inner frames 75 of the first valve 71A and the second valve 71B are protruded toward the center axis C direction (inward in the radial direction) from the valve seat 63.

In the state that the first valve 71A is abutted to the valve seat 63, there forms a gap between the second valve 71B and an end face 64*f* of the valve body holder 64 on the second end 40*b* side.

Further, the control valve section 60 is provided with a cylinder-shaped sleeve 78 and a coil spring 79.

The sleeve 78 is accommodated in the concave portion 54 at the outer circumferential side of the boss portion 55 of the valve seat member 50 and is arranged as being movable along the center axis C direction from the bottom face 54*b* of the concave portion 54 toward the valve body holder 64. An end 78*a* of the sleeve 78 on the first end 40*a* side is abutted to the outer frame 74 of the first valve 71A. A ring-shaped rib 78*r* extending toward the center axis C (inward in the radial direction) is formed at the end 78*a* of the sleeve 78.

The coil spring 79 is arranged inside the sleeve 78. The coil spring 79 is arranged in a compressed state between the bottom face 54*b* of the concave portion 54 of the valve seat member 50 and the rib 78*r* of the sleeve 78. The coil spring 79 is kept in the compressed state when a current is applied to the coil 66 of the solenoid actuator 62 owing to that urging force of the drive valve 61 toward the second end 40*b* is exerted thereto via the second valve 71B, the spacer 73, the first valve 71A, and the sleeve 78.

In the shock absorber 10 structured as described above, when a rear wheel of a motorcycle moves vertically following roughness of a road, the piston rod 13 moves against the cylinder 11 along the center axis C direction. Accordingly, the piston 12 in the cylinder 12 slides along the center axis C direction integrally with the piston rod 13.

[Compression Stroke]

In a compression stroke in which the piston 12 moves in the cylinder 11 toward the body side, oil in the piston-side oil chamber S1 is compressed by the piston 12. Then, oil in the piston-side oil chamber S1 is fed to the first oil chamber S11 formed in the damper holding portion 27 through the oil hole 102 formed at the damper case 16. As indicated by an arrow C1 in FIG. 3, oil fed to the first oil chamber S11 passes through the compression-side inlet oil paths 48*c* formed at the compression-side valve seat member 48 of the main damper 42, pushes and opens the compression-side damper valve 47 arranged at the outlet side thereof, and flows into the second oil chamber S12.

Damping force is generated at that time when oil passes through a gap formed between the outlet of the compression-side inlet oil paths 48*c* and the compression-side damping valve 47 while the compression-side damping valve 47 is pushed and opened.

A part of oil flown into the second oil chamber S12 passes through the communication path 107 formed at the damper case 16 and flows into the oil reserving chamber S3 as indicated by an arrow C2 in FIG. 3 to compensate volume change in the cylinder 11 due to the piston rod 13 with movement of the piston 12. Further, as indicated by an arrow C3 in FIG. 3, the remaining part of oil flown into the second oil chamber S12 flows into the compression-side outlet oil paths 44*c* of the extension-side valve seat member 44, pushes and opens the compression-side check valve 43, and flows into the third oil chamber S13.

As indicated by an arrow C4 in FIG. 3, oil flown into the third oil chamber S13 flows into the center channel 106 through the distal end of the small-diameter portion 51 of the valve seat member 50 and proceeds toward the control valve section 60.

As indicated by an arrow C5 in FIG. 4, in the control valve section 60, oil passes through the gap channel 110 formed between the inner circumferential edge 75*e* of the inner frame 75 of the first valve 71A and the inner circumferential edge 75*e* of the inner frame 75 of the second valve 71B and flows into the first oil chamber S11 at the outer circumference side of the valve seat member 50 through the channel hole 56 formed at the large-diameter portion 52 of the valve seat member 50.

Here, the opening of the gap channel 110 having the dimension defined by the thickness of the spacer 73 arranged between the first valve 71A and the second valve 71B forms the orifice S having sufficiently small sectional area compared to the center channel 106. Damping force is generated owing to that oil passes through the orifice S.

Figure 6:
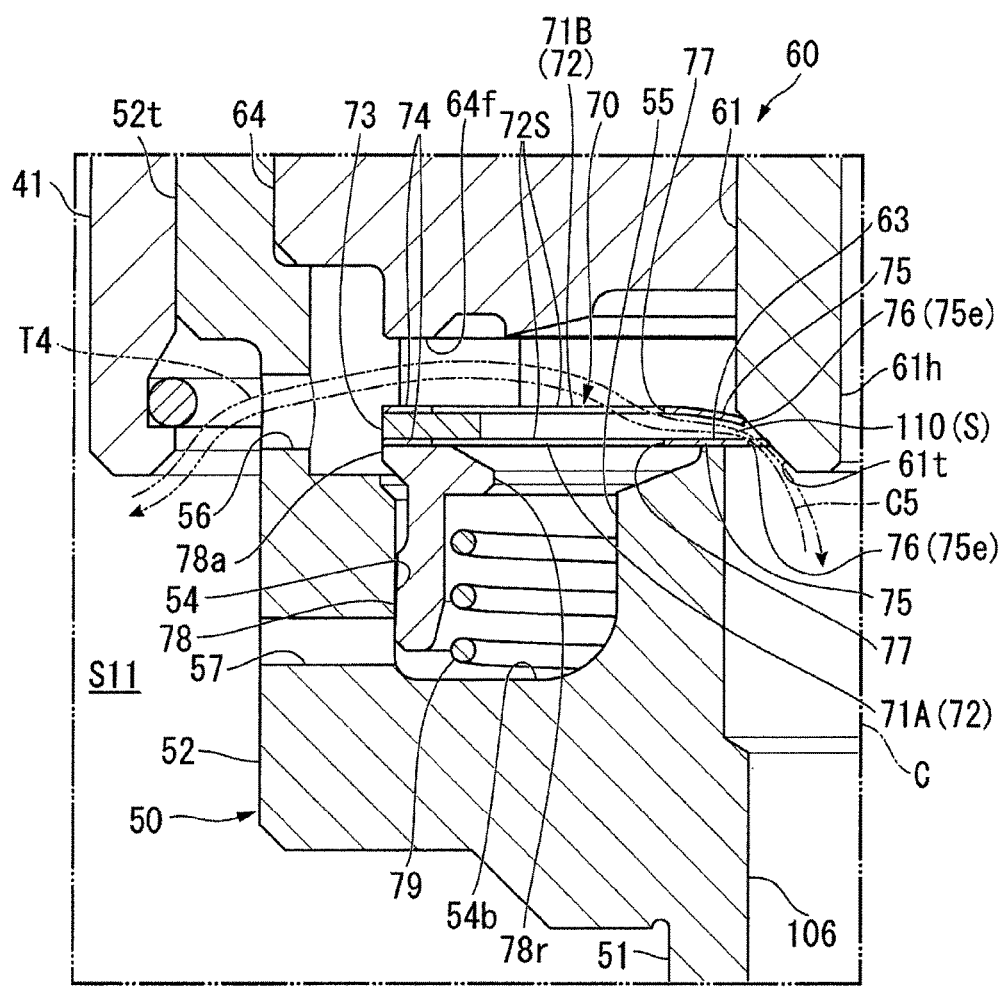
FIG. 6 is a sectional view illustrating a state that an opening dimension of an orifice is lessened owing to that a valve body is displaced toward a valve seat by a solenoid actuator to bend and deform the second valve with pressing.

FIG. 6 is a sectional view illustrating a state that an opening dimension of the orifice is lessened owing to that the valve body is displaced toward the valve seat by the solenoid actuator to bend and deform the second valve with pressing.

As illustrated in FIG. 6, the drive valve 61 is protruded toward the valve seat 63 (toward the second end 40*b*) by increasing the current applied to the coil 66 of the solenoid actuator 62, and the spokes 72S of the second valve 71B are bent and deformed in a direction in which the inner frame 75 side approaches the first valve 71A. Then, the opening dimension of the gap channel 110 formed between the inner circumferential edge 75*e* of the inner frame 75 of the first valve 71A and the inner circumferential edge 75*e* of the inner frame 75 of the second valve 71B becomes smaller than the thickness dimension of the spacer 73. Accordingly, damping force to be generated when oil passes through the gap channel 110 (orifice S) can be increased by lessening the opening area of the orifice S. Thus, the control valve section 60 can adjust damping force to be generated by controlling a bending deformation amount of the second valve 71B with the solenoid actuator 62.

Figure 7:
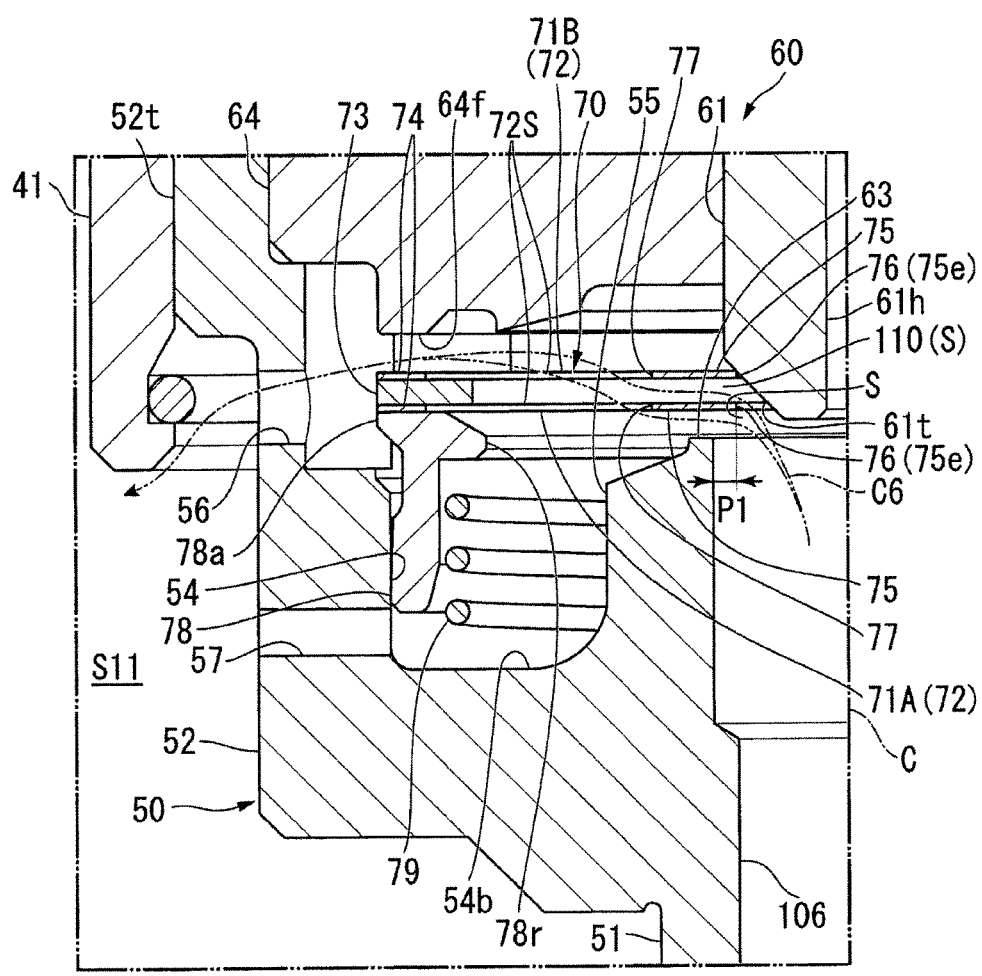
FIG. 7 is a sectional view illustrating a state that an adjusting valve portion and the valve body are displaced by oil pressure in a direction of being apart from the valve seat in a compression stroke.

FIG. 7 is a sectional view illustrating a state that the adjusting valve portion and the valve body are displaced by oil pressure in a direction of being apart from the valve seat in the compression stroke.

As illustrated in FIG. 7, when the wheel moves rapidly in the vertical direction with roughness of a road and the piston 12 moves at high speed in the cylinder 11, owing to pressure caused by flow of oil indicated by an arrow C6 arriving at the control valve section 60 after passing through the center channel 106 of the valve seat member 50 via the main damper 42, the inner frame 75 of the first valve 71A is pushed toward the drive valve 61 (toward the first end 40*a*) at a portion thereof protruded toward the center axis C (inward in the radial direction) from the valve seat 63 being a pressure receiving portion P1. When the oil pressure is large at that time, the first valve 71A, the spacer 73, the second valve 71B, and the drive valve 61 is pushed against the urging force generated by the solenoid actuator 62 and displaced toward the first end 40*a*. At that time, since oil flows to the drive valve 61 side of the first valve 71A, pressure at the valve seat 63 side of the first valve 71A is the same as that at the drive valve 61 side thereof. Accordingly, the first valve 71A is lifted without being bent along with the second valve 71B and the drive valve 61. Consequently, in addition to the orifice S of the gap channel 110 between the first valve 71A and the second valve 71B, an orifice S is formed as well between the inner frame 75 of the first valve 71A and the valve seat 63. That is, area of the orifices S, S formed at the control valve section 60 is increased. Damping force is generated when oil passes through the orifices S, S.

Oil passing through the orifices S, S flows into the first oil chamber S11 through the channel hole 56 formed at the large-diameter portion 52 of the valve seat member 50. Here, the channel hole 57 has a smaller diameter that the channel hole 56. Oil does not flow through the channel hole 57 during normal operation.

[Extension Stroke]

In an extension stroke in which the piston 12 moves in the cylinder 11 toward the wheel side with vertical movement of the wheel, oil in the rod-side oil chamber S2 is compressed by the piston 12. Then, oil in the rod-side chamber S2 flows into the cylinder-shaped channel path 101 formed between the inner cylinder 14 and the outer cylinder 15 after passing through the oil holes 103 formed at the lower end of the inner cylinder 14. Oil flowing through the channel 101 passes through the channel 105 formed at the damper case 16 from the oil holes 104 formed at the upper end of the outer cylinder 15 and is fed to the third oil chamber S13 of the damping force generating device 40.

As indicated by an arrow T1 in FIG. 3, oil fed to the third oil chamber S13 flows into the extension-side inlet oil path 44t of the extension-side valve seat member 44 and pushes and opens the extension-side damping valve 45 arranged at the outlet side thereof, so that damping force is generated.

Oil passing through the gap formed between the extension-side inlet oil paths 44t and the extension-side damping valve 45 flows into the second oil chamber 12. Further, as indicated by an arrow T2 in FIG. 3, oil flows from the oil reserving chamber S3 into the second oil chamber S12 as passing through the communication path 107 formed at the damper case 16 to compensate volume change in the cylinder 11 due to the piston rod 13 with movement of the piston 12.

As indicated by an arrow T3 in FIG. 3, oil flown into the second oil chamber S12 passes through the extension-side outlet oil paths 48t of the compression-side valve seat member 48 and flows into the first oil chamber S11 as pressing and opening the extension-side outlet check valve 49.

As indicated by an arrow T4 in FIG. 4, oil in the first oil chamber S11 flows to the inside of the large-diameter portion 52 of the valve seat member 50 from the channel hole 56 formed at the large-diameter portion 52 of the valve seat member 50. Further, oil passes through the gap channel 110 (orifice S) between the inner frame 75 of the first valve 71A and the inner frame 75 of the second valve 71B from the openings 77 formed at the second valve 71B and flows into the center channel 106 formed at the valve seat member 50. Damping force is generated owing to that oil passes through the gap channel 110.

In this case as well, the opening dimension of the gap channel 110 can be varied by controlling a bending deformation amount of the second valve 71B with the solenoid actuator 62. As illustrated in FIG. 6, when the drive valve 61 is protruded toward the valve seat 63 (toward the second end 40b) by increasing the current applied to the coil 66 of the solenoid actuator 62, the spokes 72S of the second valve 71B are bent and deformed in a direction in which the inner frame 75 side approaches the first valve 71A. Then, the opening dimension of the gap channel 110 formed between the inner circumferential edge 75e of the inner frame 75 of the first valve 71A and the inner circumferential edge 75e of the inner frame 75 of the second valve 71B becomes smaller than the thickness dimension of the spacer 73. Accordingly, damping force to be generated when oil passes through the gap channel 110 (the orifice S) as indicated by an arrow T4 in FIG. 6 can be increased by lessening the opening area of the orifice S.

Figure 8:
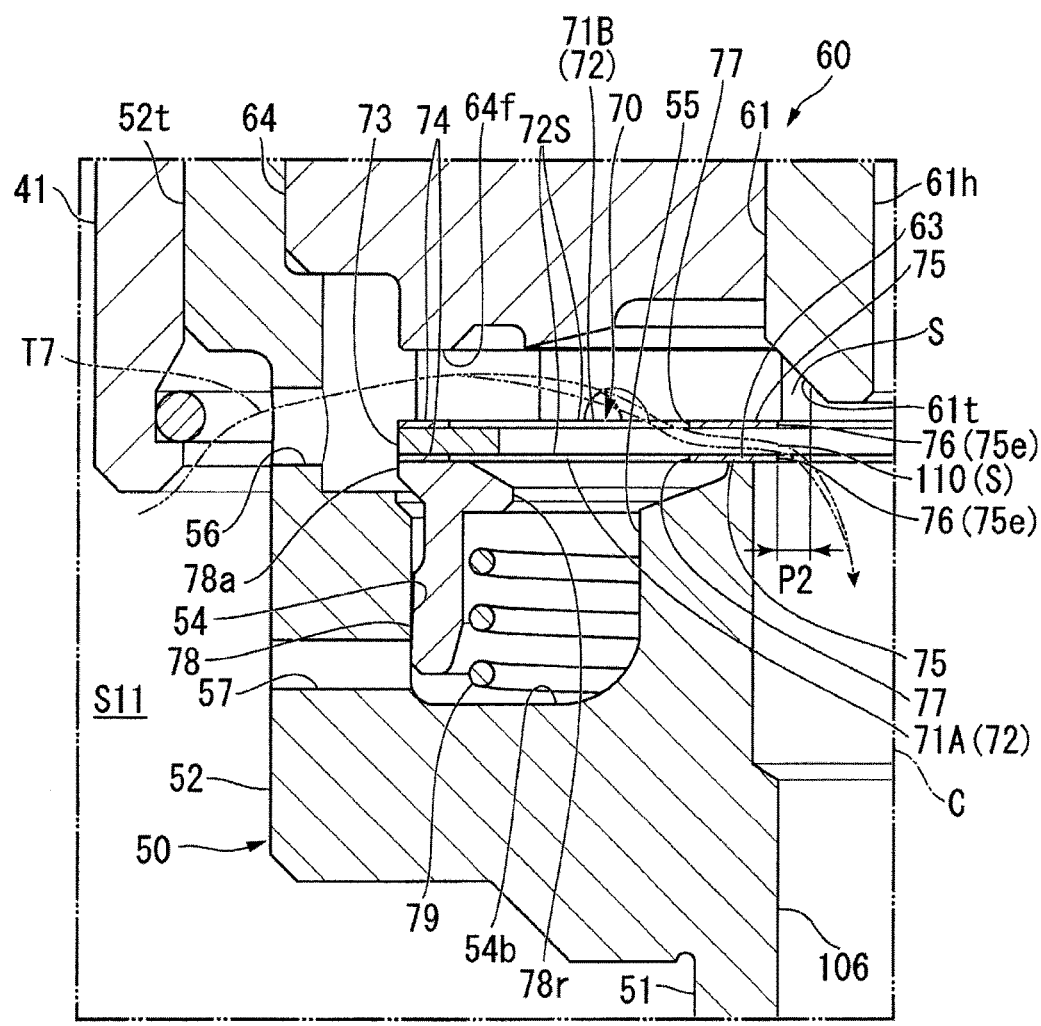
FIG. 8 is a sectional view illustrating a state that the valve body is displaced by oil pressure in a direction of being apart from the valve seat in an extension stroke.

FIG. 8 is a sectional view illustrating a state that the valve body is displaced by oil pressure in a direction of being apart from the valve seat in the extension stroke.

When the wheel moves rapidly in the vertical direction with roughness of a road and the piston 12 moves at high speed in the cylinder 11, a part of oil flown into the large-diameter portion 52 through the channel hole 56 formed at the large-diameter portion 52 of the valve seat member 50 as indicated by an arrow T7 in FIG. 8 strongly hits the taper portion 61t of the drive valve 61.

Here, back pressure to push the drive valve 61 from the first end 40a side toward the valve seat 63 side is exerted to the drive valve 61. This is caused by oil flowing into the back pressure chamber 65r through the through-hole 61h formed at the drive valve 61 and the through-hole 67h of the rod 67. Most of the pressure caused by oil hitting the taper portion 61t of the drive valve 61 is cancelled by the back pressure. Consequently, at the taper face of the drive valve 61, the drive valve 61 is pushed in a direction of being apart from the valve seat 63 by the pressure exerted on a pressure receiving portion P2, the pressure receiving portion P2 being a portion of the drive valve 61 at the outer circumference side from the outer diameter of the rod 67 and at the outer circumference side from the inner circumferential edge 75e of the inner frame 75 of the second valve 71B.

When the pressure of oil exerted on the pressure receiving portion P2 exceeds the urging force of the solenoid actuator 62, the drive valve 61 moves in a direction of being apart from the second valve 71B toward the first end 40a. Then, in addition to the orifice S of the gap channel 110 between the inner frame 75 of the first valve 71A and the inner frame 75 of the second valve 71B, an orifice S is formed as well between the taper portion 61t of the drive valve 61 and the inner circumferential edge 75e of the inner frame 75 of the second valve 71B. That is, area of the orifices S, S formed at the control valve section 60 is increased. Damping force is generated when oil passes through the orifices S, S. Oil passing through the orifices S, S flows into the third oil chamber S13 through the center channel 106 of the valve seat member 50.

In the control valve section 60, the damping force generating device 40, and the shock absorber 10 of the present embodiment, there are provided the valve seat member 50 including the valve seat 63 that is formed at the outer side, in the radial direction, of the opening at one end of the center channel 106 for oil, the drive valve 61 arranged to be movable in the direction of being contacted to and apart from the valve seat 63, the plate-shaped second valve 71B (valve body 72) made of an elastic material having the openings 77 through which oil passes as being arranged between the valve seat 63 and the drive valve 61, the first valve 71A and the spacer 73 that causes the second valve 71B to face the valve seat 63 via a predetermined gap with respect thereto, and the solenoid actuator 62 that causes the gap between the inner circumference of the second valve 71B and the valve seat 63 to be variable by moving the drive valve 61 in a direction of approaching the valve seat 63 and elastically deforming the second valve 71B in a direction that the inner circumference of the second valve 71B approaches the valve seat 63.

According to the above structure, damping force is generated when oil passes through the orifice S of the gap between the second valve 71B and the valve seat 63. In a state that the plate-shaped second valve 71B is not elastically deformed by the drive valve 61, the position of the second valve 71B with respect to the valve seat 63 is determined at high accuracy by the first valve 71A and the spacer 73. Owing to that the second valve 71B (valve body 72) is elastically deformed with the drive valve 61 being moved by the solenoid actuator 62, a gap dimension of the gap channel 110 (orifice S) between the valve body 72 and the valve seat 63 is adjusted, so that damping force to be generated at the gap can be adjusted at higher accuracy.

Further, the second valve 71B includes the ring-shaped outer frame 74, the ring-shaped inner frame 75 arranged at the inner side in the radial direction of the outer frame 74, and the spokes 72S connecting the outer frame 74 and the inner frame 75. The spacer 73 is arranged as facing the outer frame 74. According to the above, when the inner frame 75 of the second valve 71B is pushed toward the valve seat 63 by the drive valve 61, the second valve 71B is bent toward the first valve 71A having the spacer 73 arranged at the outer frame 74 side as a fulcrum. Thus, the gap dimension of the gap channel 110 that forms the orifice S between the first valve 71A and the second valve 71B becomes variable.

Further, the first valve 71A is formed by the plate-shaped valve body 72. Accordingly, as the first valve 71A and the second valve 71B, the same type of valve bodies 72 are simply required to be layered via the spacer 73, so that assembling thereof can be easily performed.

Here, the spacer 73 is sandwiched by the first valve 71A and the second valve 71B. Accordingly, the gap dimension of the gap channel 110 that forms the orifice S is determined by the thickness of the spacer 73. The spacer 73 can be formed by punching a plate material with pressing or the like, so that the plate thickness can be easily set at high accuracy. Accordingly, damping force to be generated at the orifice S can be adjusted at high accuracy.

Further, in the compression stroke, when oil flows from the valve seat 63 side, the first valve 71A is pushed by the oil pressure and caused to be apart from the valve seat 63. Then, the orifice S is formed as well between the valve seat 63 and the first valve 71A, so that damping force is generated.

In the compression stroke, when oil flows from the center channel 106 side at the inner side of the valve seat 63 toward the drive valve 61 and pressure at the valve seat 63 side of the first valve 71A becomes higher than pressure at the drive valve 61 side of the second valve 71B, oil pressure is exerted to the portion of the first valve 71A protruded inward in the radial direction of the valve seat 63 as being the pressure receiving portion P1. Accordingly, the first valve 71A is lifted without being bent along with the second valve 71B and the drive valve 61, so that damping force can be generated at the orifice S formed at the gap thereof.

In the extension stroke, when oil flows from the drive valve 61 side toward the valve seat 63 and pressure at the drive valve 61 side of the second valve 71B becomes higher than pressure at the valve seat 63 side of the first valve 71A, oil pressure is exerted to the portion of the drive valve 61 protruded inward in the radial direction of the inner frame 75 of the second valve 71B as being the pressure receiving portion P2. Accordingly, the drive valve 61 is lifted as being apart from the second valve 71B while the second valve 71B is not bent, so that the orifice S is formed and damping force can be generated.

Thus, in both of the compression stroke in which oil flows from the valve seat 63 side toward the drive valve 61 and the extension stroke in which oil flows from the drive valve 61 side toward the valve seat 63, damping force can be generated at the control valve section 60.

Further, the damping force generating device 40 includes the control valve section 60 described above, and the main damper 42 that generates damping force due to oil circulation as being arranged independently from the control valve section 60. Accordingly, oil is circulated to the control valve section 60 and the main damper 42 and damping force is generated with the oil circulation respectively at both thereof. With this structure, damping force can be generated at the main damper 42 even when the control valve section 60 malfunctions for some reason.

Further, the shock absorber 10 includes the control valve section 60 described above, the cylinder 11 in which oil is encapsulated, the piston 12 slidably fitted into the cylinder 11, the piston rod 13 extending outside the cylinder 11 as being connected to the piston 12, and the oil reserving chamber S3 that compensates an oil amount equivalent to advancing volume of the piston rod 13 when the piston rod 13 advances in the cylinder 11. Owing to that oil is caused to flow through the control valve section 60 by sliding of the piston 12 in the cylinder 11, damping force is generated and oil passing through the control valve section 60 can be circulated to the oil reserving chamber S3.

In the shock absorber 10 described above, oil in the main damper 42 can also be circulated to the oil reserving chamber S3. In more detail, the main damper 42 includes the compression-side damping valve 47 that generates damping force in the compression stroke, the compression-side check valve 43 arranged at the downstream side of the compression-side damping valve 47 in the compression stroke, the extension-side damping valve 45 that generates damping force in the extension stroke, and the extension-side check valve 49 arranged at the downstream side of the extension-side damping valve 45 in the extension stroke. The oil reserving chamber S3 is communicated with between the compression-side damping valve 47 and the compression-side check valve 43 and is communicated with between the extension-side damping valve 45 and the extension-side check valve 49.

According to the above structure, the oil amount in the cylinder 11 is compensated by communication with the oil reserving chamber S3 in accordance with advancing volume of the piston rod 13 into the cylinder 11. Pressure in the rod-side oil chamber S2 in the cylinder 11 depends approximately only on pressure of the oil reserving chamber S3. Accordingly, it is possible to avoid occurrence of a phenomenon, that is, so-called sloth of damping force, that required damping force is not normally generated owing to that pressure of the rod-side oil chamber S2 does not increase rapidly when shifting from the compression stroke to the extension stroke.

[Modifications]

In the abovementioned embodiment, the control valve section 60 includes the first valve 71A and the second valve 71B. However, it is also possible that the control valve section 60 may have three or more valve bodies.

Figure 9:
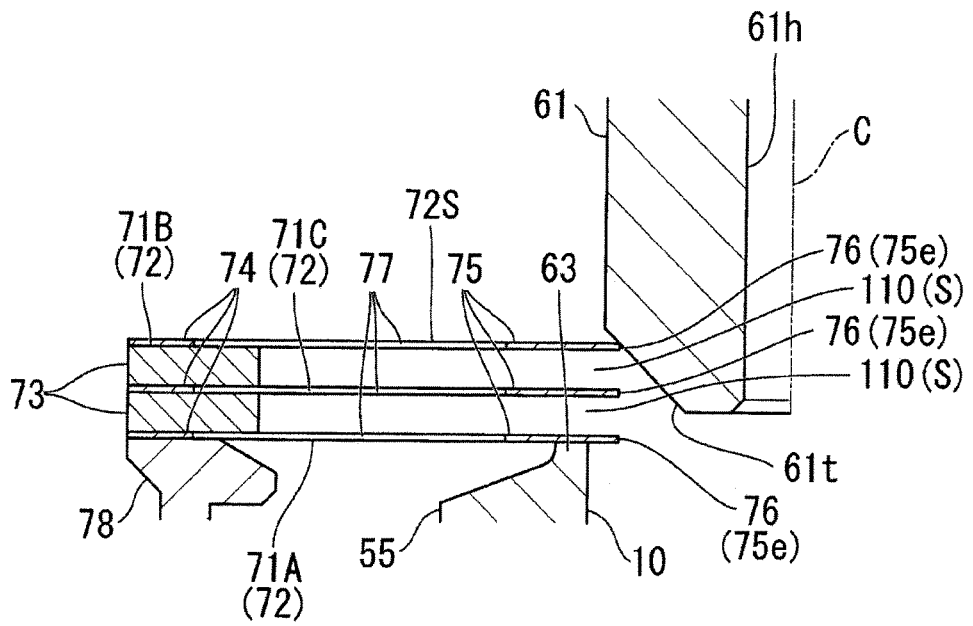
FIG. 9 is a sectional view illustrating a modification of the damping force generating device.

For example, as illustrated in FIG. 9, it is also possible that two spacers 73 are arranged between the first valve 71A and the second valve 71B and a third valve 71C being a valve body 72 is arranged between the spacers 73 adjacent in the center axis C direction.

In this case, the control valve section 60 includes three valve bodies 72 being the first to third valves 71A, 71B, 71C and the gap channel 110 having the orifice S can be formed respectively between the first valve 71A and the third valve 71C and between the third valve 71C and the second valve 71B.

Figure 10:
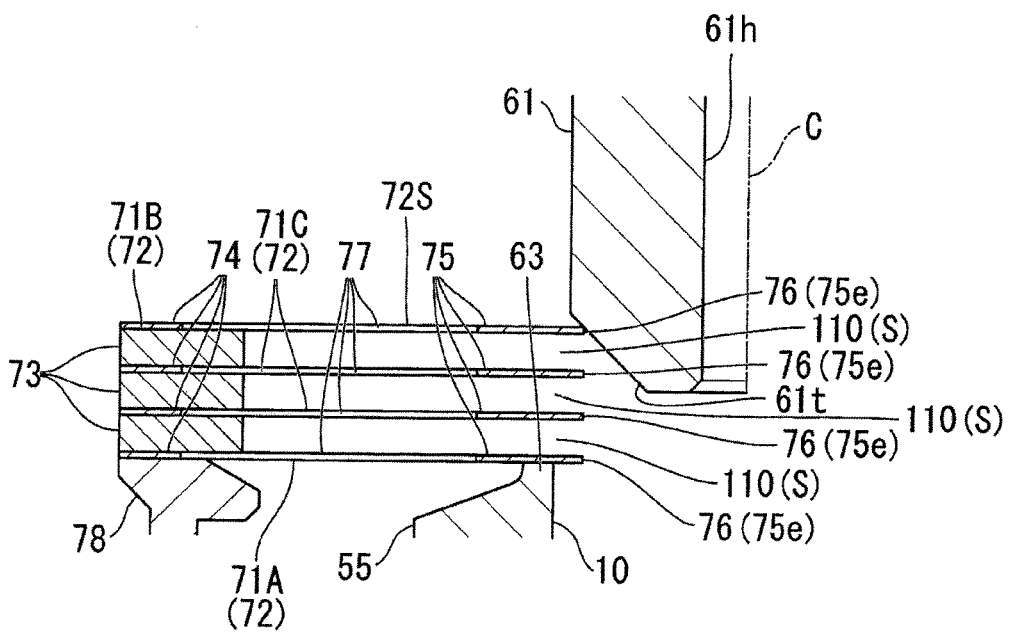
FIG. 10 is a sectional view illustrating a modification of the damping force generating device.

As illustrated in FIG. 10, it is also possible that three spacers 73 are arranged between the first valve 71A and the second valve 71B and a third valve 71C being a valve body 72 is arranged respectively between the adjacent spacers 73 in the center axis C direction.

In this case, the control valve section 60 includes four valve bodies 72 in total being the first valve 71A, the second valve 71B, and the two third valves 71C and the gap channel 110 having the orifice S can be formed respectively between the first valve 71A and the third valve 71C, between the third valves 71C, and between the third valve 71C and the second valve 71B.

Further, it is also possible to arrange three or more third valves 71C. That is, n (n≥2) pieces of spacers 73 are arranged between the first valve 71A and the second valve 71B and each of third valves 71C being (n−1) pieces of valve bodies 72 is arranged between the spacers 73 adjacent to each other. According to the above, a plurality of the orifices S, S can be formed between the first valve 71A and the third valve 71C, between the third valves 71C, and between the third valve and the second valve 71B, layered as sandwiching the spacer 73.

Accordingly, owing to that the number of the third valves 71C to be layered between the first valve 71A and the second valve 71B as sandwiching the spacer 73 is adjusted, damping force to be generated by oil passing between the first valve 71A, the second valve 71B, and the third valve(s) 71C can be adjusted.

Other Embodiments

The present disclosure is not limited to the embodiment and modifications thereof described above with reference to the drawings and a variety of modifications can be further considered in the technical scope thereof.

For example, each of the first to third valves 71A to 71C may be formed by layering a plurality of valve bodies 72.

In the above, the first valve 71A and the second valve 71B form the gap channel 110 by being caused to be apart from each other by the thickness amount of the spacer 73. However, depending on the thickness of the spacer 73, it is also possible to be configured that damping force is not generated at the gap channel 110 when the second valve 71B is not bent and deformed by the drive valve 61. In this case, damping force is generated at the gap channel 110 when the spokes 72S of the second valve 71B are bent and deformed by the drive valve 61 so that the gap channel 110 is narrowed to have a predetermined dimension or smaller.

In the abovementioned embodiment, the second valve 71B to be bent and deformed by the drive valve 61 is positioned to the valve seat 63 via the first valve 71A and the spacer 73.

Figure 11:
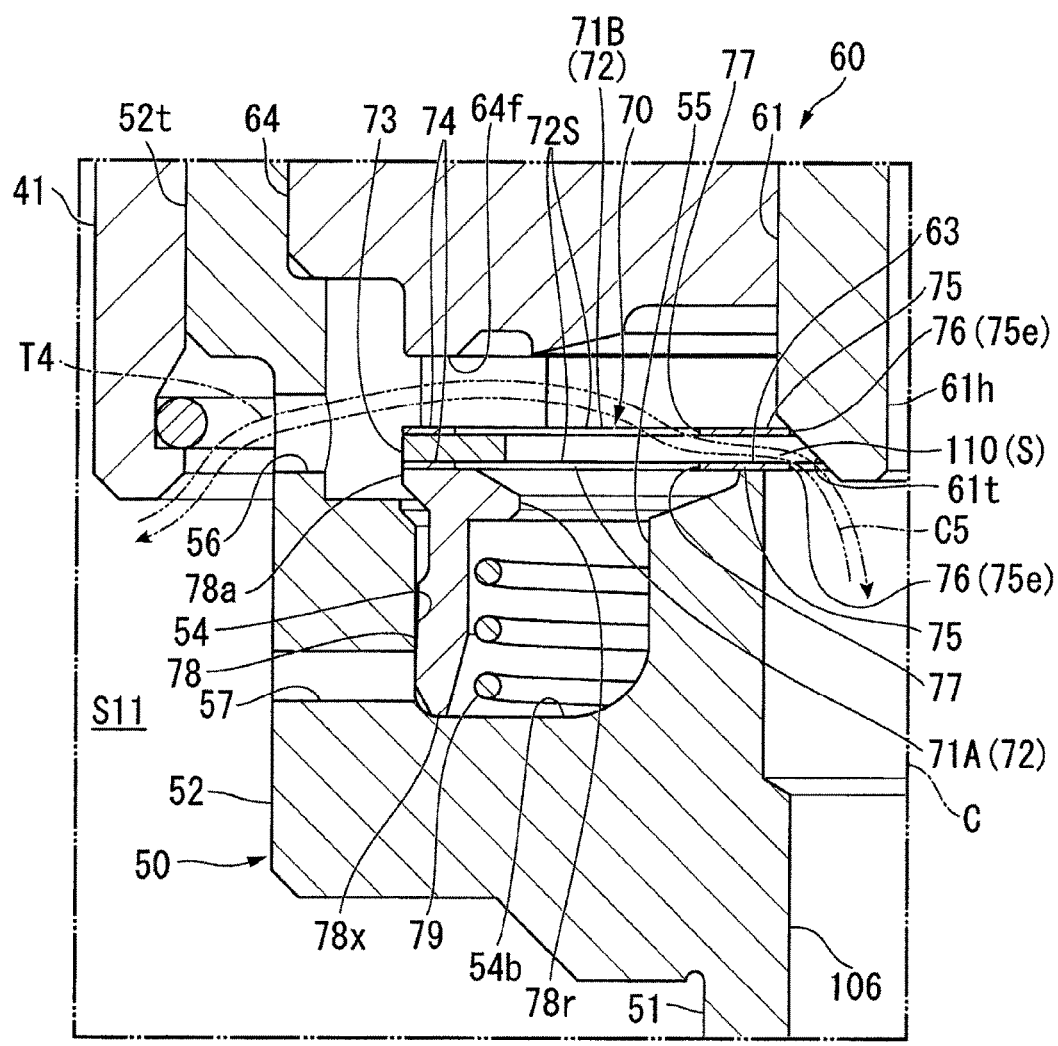
FIG. 11 is a sectional view illustrating a modification of the damping force generating device.
Figure 12:
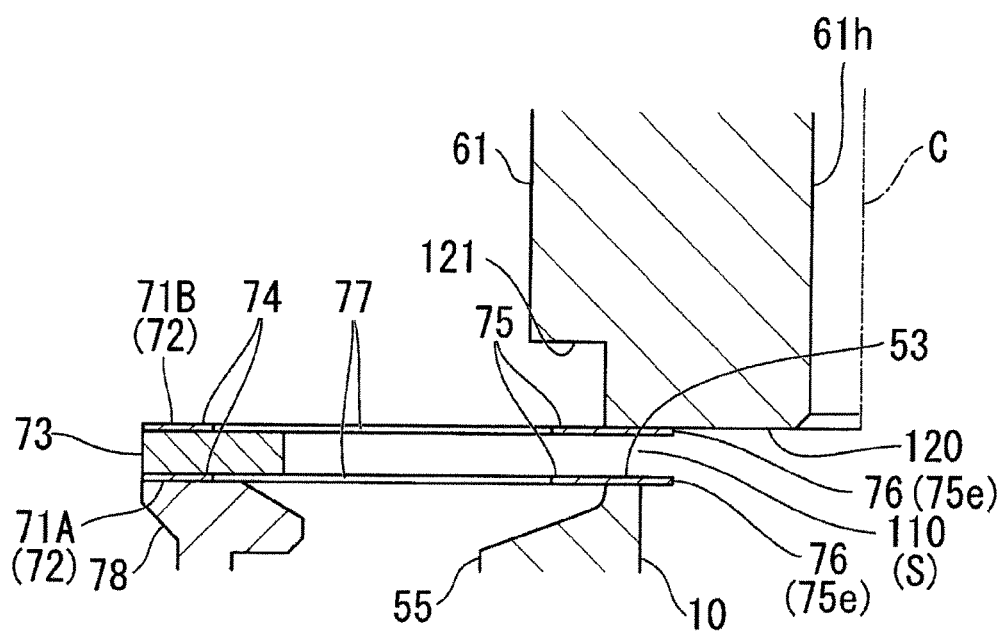
FIG. 12 is a sectional view illustrating a modification of the damping force generating device.

However, it is also possible that positioning of the first valve 71A and the second valve 71B to the valve seat 63 is performed by the sleeve (valve positioning member) 78, as illustrated in FIG. 11. In this case, the positioning can be performed owing to that a lower end 78x of the sleeve 78 is abutted to the bottom face 54b of the concave portion 54.

Other than the above, for example, it is also possible that projections protruded inward in the radial direction are formed at the inner circumferential face of the concave portion 54 of the large-diameter portion 52 and positioning of the second valve 71B to the valve seat 63 is performed by the projections. It is also possible to separately arrange a member for positioning the second valve 71B to the valve seat 63 in the concave portion 54.

In the abovementioned embodiment, similarly to the second valve 71B, the first valve 71A is formed into a shape having the inner frame 75, the outer frame 75, and the openings 77. However, it is also possible to have another appropriate structure such as a ring-shaped plate.

Further, not limited to a ring shape continuing on the entire circumference in the circumferential direction, the outer frame 74 may be formed at a plurality of positions as being distanced in the circumferential direction.

The first valve 71A may be formed integrally with the sleeve 78. The second valve 71B may be formed into a shape without having the center hole 76.

In the abovementioned embodiment, the first valve 71A and the second 71B valve are formed into the same shape. However, not limited thereto, it is also possible to be formed into shapes being different, for example, in the number, shape, and size of the openings 77.

In the abovementioned embodiment, the drive valve 61 is formed into a shape having the taper portion 61t at the distal end thereof. However, not limited thereto, it is also possible that the drive valve 61 is formed into a different appropriate shape as long as having pressure receiving faces 120, 121 orthogonal to the oil flow direction to ensure oil pressure receiving area.

Further, the oil flow directions in the valve-opening stroke and the valve-closing stroke may be reversed compared to the configuration of the abovementioned embodiment.

In the abovementioned embodiment, the main damper 42 and the control valve section 60 are arranged. Here, it is possible that the control valve section 60 serves as a main damping force generating portion and the main damper 42 serves as an auxiliary damping force generating portion. Alternatively, the main damper 42 and the control valve section 60 may serves as even damping force generating portions.

Other than the above, a configuration described in the above embodiments may be selected or appropriately replaced with another configuration without departing from the scope of the present disclosure.

DESCRIPTION OF REFERENCES

10: Shock absorber, 11: Cylinder, 12: Piston, 13: Piston rod, 40: Damping force generating device, 42: Main damper (Damping force generating device), 50: Valve seat member (Housing), 60: Control valve section (Valve mechanism), 61: Drive valve, 62: Solenoid actuator (Drive valve moving mechanism, Pressing force adjusting portion, Actuator), 63: Valve seat, 70: Adjusting valve portion, 71A: First valve (Valve positioning member), 71B: Second valve, 71C: Third valve, 72: Valve body, 72S: Spoke, 73: Spacer (Valve positioning member), 74: Outer frame, 75: Inner frame, 76: Center hole (Through-hole), 77: Opening, 78: Sleeve (Valve positioning member), 106: Center channel (Channel), 107: Communication path, 110: Gap channel, C: Center axis, S: Orifice, S3: Oil reserving chamber

What is claimed is:

1. A valve mechanism, comprising:
a housing including a valve seat that is formed at the outer side, in the radial direction, of an opening at one end of a fluid channel;
a drive valve arranged to be movable in a direction of being contacted to and apart from the valve seat;
a plate-shaped valve body that is made of an elastic material having an opening through which fluid passes and is arranged between the valve seat and the drive valve;
a valve positioning member that causes the valve body to face the valve seat via a predetermined gap with respect to the valve seat; and
a drive valve moving mechanism that causes the gap between an inner circumference of the valve body and the valve seat to be variable by moving the drive valve in a direction of approaching the valve seat and elastically deforming the valve body in a direction that the inner circumference of the valve body approaches the valve seat, wherein
the valve body comprises a through-hole at a center thereof and
a diameter at a distal end of the drive valve is lessened toward a valve seat side so that the through-hole is closed when the distal end contacts the inner circumference of the valve body.

2. The valve mechanism according to claim 1, comprising:
a plurality of the valve bodies; and
a spacer sandwiched between the plurality of valve bodies.

3. The valve mechanism according to claim 2,
wherein each valve body includes a ring-shaped outer frame, a ring-shaped inner frame arranged at the inner side in the radial direction of the outer frame, and a spoke connecting the outer frame and the inner frame as being arranged to face the outer frame.

4. The valve mechanism according to claim 1, wherein the valve positioning member is a cylinder-shaped sleeve arranged as being capable of moving in the housing in a direction that the valve body is contacted to and apart from the valve seat.

5. The valve mechanism according to claim 1, further comprising:
an actuator that presses the drive valve toward the valve seat; and
a pressing force adjusting portion that adjusts pressing force to press the drive valve to the valve body with the actuator.

6. The valve mechanism according to claim 1, wherein when the drive valve moves in the direction of approaching the valve seat, the valve body deforms in a direction that an innermost edge of the inner circumference of the valve body approaches the valve seat.

7. The valve mechanism according to claim 1, wherein a diameter at a distal end of the drive valve is lessened toward a valve seat side.

8. A damping force generating device, comprising;
the valve mechanism according to claim 1; and
a main damper that generates damping force due to fluid circulation and is arranged independently from the valve mechanism.

9. A shock absorber comprising:
the valve mechanism according to claim 1;
a cylinder in which fluid is encapsulated;
a piston slidably fitted into the cylinder;
a piston rod that extends outside the cylinder and is connected to the piston; and
an oil reserving chamber that compensates an oil amount equivalent to advancing volume of the piston rod when the piston rod advances in the cylinder,
wherein damping force is generated owing to that fluid is caused to flow through the valve mechanism by sliding of the piston in the cylinder, and
the fluid flowing through the valve mechanism is capable of being circulated to the oil reserving chamber.

10. The shock absorber according to claim 9, further comprising a main damper that generates damping force due to fluid circulation and is arranged independently from the valve mechanism,
wherein the fluid flowing through the main damper is capable of being circulated to the oil reserving chamber.

* * * * *